United States Patent [19]

Goeser et al.

[11] Patent Number: 4,685,857

[45] Date of Patent: Aug. 11, 1987

[54] VEHICLE LOAD-CARRYING APPARATUS

[76] Inventors: Maurice N. Goeser, 5726 Carnelian La., Eden Prairie, Minn. 55344; Alvin M. Eickhoff, 416 S. Fifth Ave., Cold Spring, Minn. 56320

[21] Appl. No.: 801,224

[22] Filed: Nov. 25, 1985

[51] Int. Cl.⁴ .............................................. B65G 67/02
[52] U.S. Cl. ..................................... 414/522; 296/26; 296/61; 414/537
[58] Field of Search .............. 414/522, 532, 537, 538, 414/469, 477, 480, 571; 296/26, 61; 211/151, 162, 175

[56] References Cited

U.S. PATENT DOCUMENTS

| | | | |
|---|---|---|---|
| 276,685 | 5/1883 | Harley | 414/537 |
| 2,584,396 | 2/1952 | Naekel | 296/61 |
| 2,852,303 | 9/1958 | Hopson | 296/26 |
| 3,006,487 | 10/1961 | Gelli | 414/522 |
| 3,381,835 | 5/1968 | Lee | 414/522 X |
| 3,642,156 | 2/1972 | Stenson | 414/537 |
| 3,642,157 | 2/1972 | Williams, Jr. | 414/522 X |
| 3,687,314 | 8/1972 | Haugland | 414/522 |
| 3,726,422 | 4/1973 | Zelin | 414/522 |
| 3,768,673 | 10/1973 | Nydam et al. | 414/522 |
| 3,829,064 | 8/1974 | Jackson | 414/522 X |
| 3,977,545 | 8/1976 | Lloyd | 414/537 |
| 4,212,580 | 7/1980 | Fluck | 414/522 |
| 4,242,032 | 12/1980 | Whiteman et al. | 414/537 |
| 4,601,632 | 7/1986 | Agee | 414/537 |

FOREIGN PATENT DOCUMENTS

| | | | |
|---|---|---|---|
| 737821 | 7/1966 | Canada | 211/162 |
| 563145 | 4/1924 | France | 414/538 |

*Primary Examiner*—Joseph E. Valenza
*Assistant Examiner*—David A. Bucci
*Attorney, Agent, or Firm*—Robert C. Baker

[57] ABSTRACT

The adjustable load-carrying apparatus is designed for mounting on the load-carrying bed of a vehicle. It includes a base frame assembly which is fixed rigidly to the vehicle bed and has laterally spaced inwardly facing rollers in longitudinal alignment along each side edge thereof plus an inward lock guide rail. A slidable platform frame assembly has lateral trackways slidably mated with the rollers of the base frame. The platform frame assembly includes a lock guide structure on its underside in cooperative relationship with a lock guide rail of the base frame assembly. Additionally, the platform assembly includes on its underside laterally spaced ramp slideways. A ramp assembly is carried for sliding movement in the ramp slideways. It includes a ramp deck as well as a forward guide section and a hinge connection between the deck and the forward guide section whereby the ramp deck may be lowered for ramp use while a foundation portion of the forward guide section remains in the ramp slideways of the slidable frame assembly.

11 Claims, 11 Drawing Figures

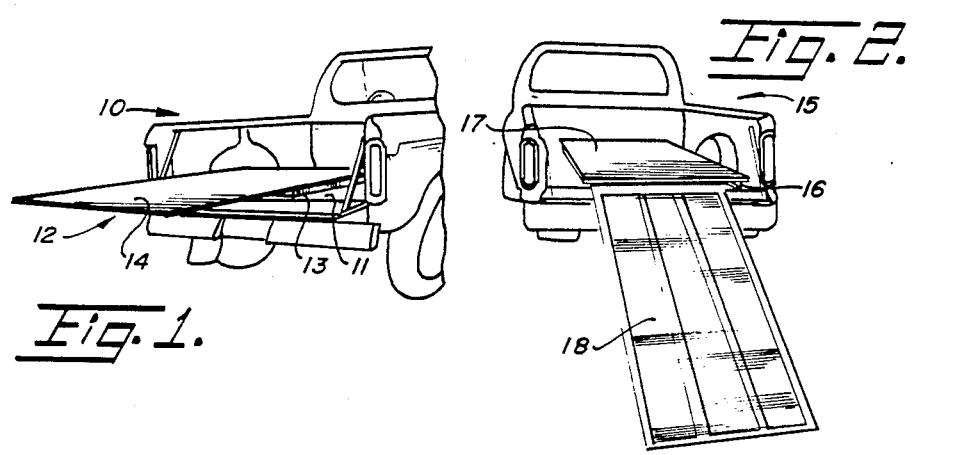
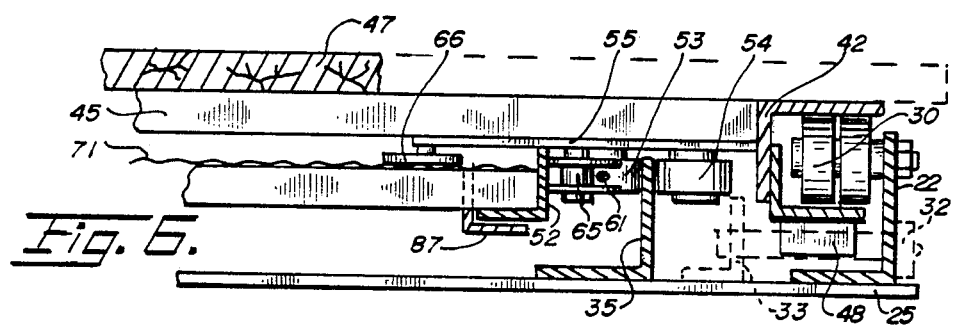
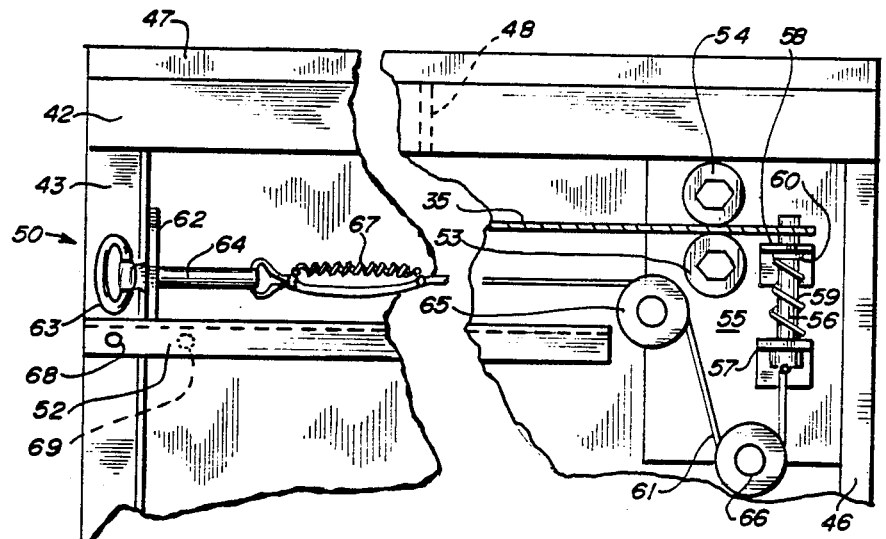

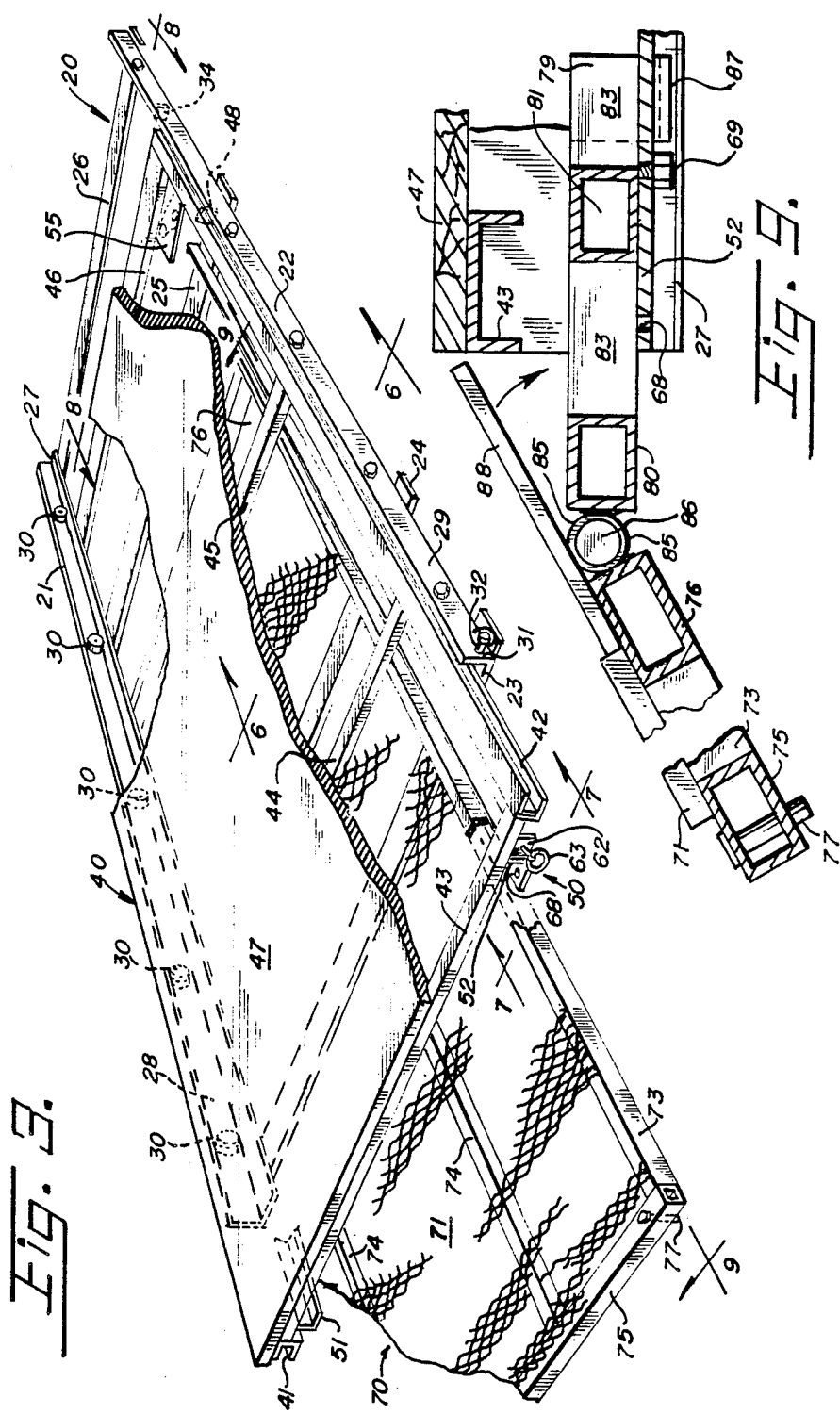

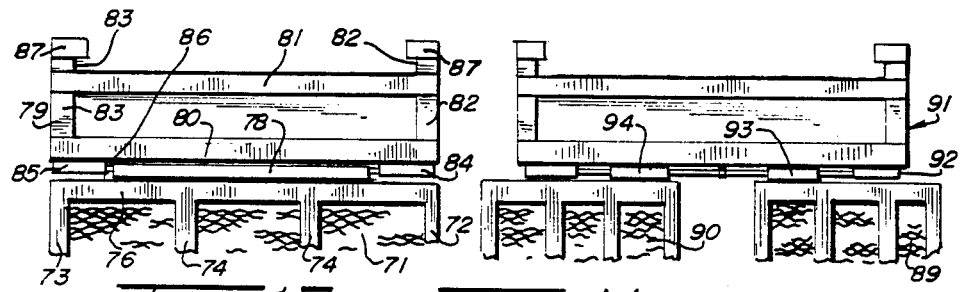
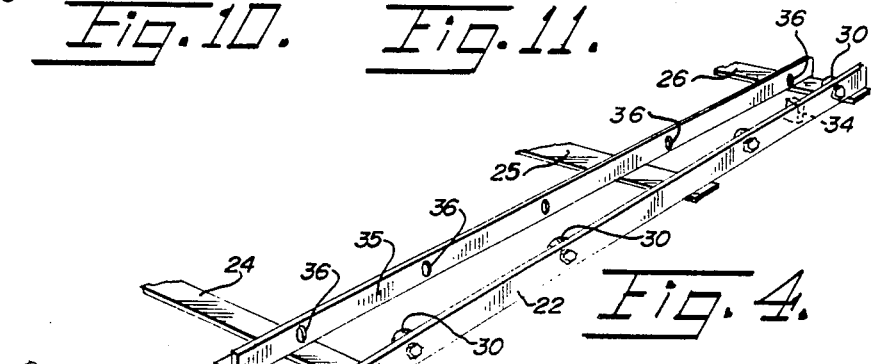
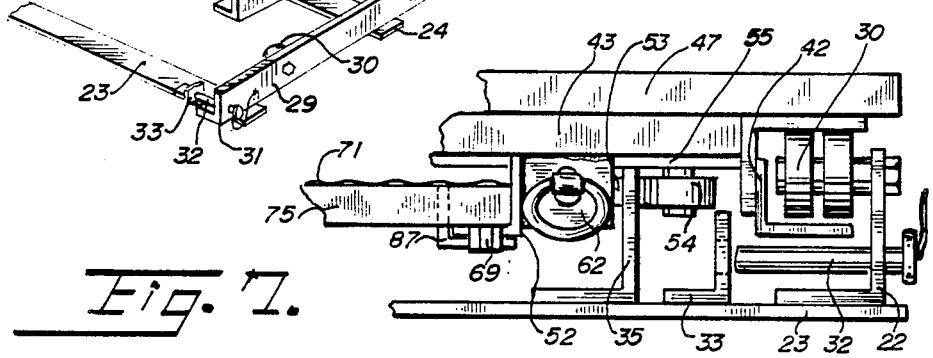
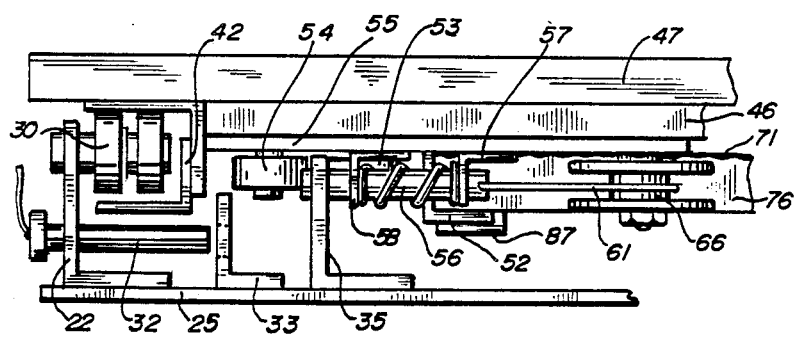

VEHICLE LOAD-CARRYING APPARATUS

BACKGROUND OF THE INVENTION

This invention relates to adjustable load-carrying apparatus for vehicles. The apparatus is mounted on an existing load-carrying bed of vehicles and facilitates vehicle loading and unloading. The adjustable apparatus is also useful to provide a convenient workbench for on-site service and repair work.

Others have heretofore proposed adjustable platforms of the slide or rollout type for loading vehicles; and others have also heretofore proposed a fixed platform above the standard load-carrying bed of a vehicle with ramp members lodged underneath the fixed platform but movable for the purpose of providing a sloped surface for driving a smaller vehicle or snowmobile or garden tractor up the ramp onto the fixed platform.

Insofar as is known, however, no one has heretofore figured out a way to provide not only a reliably strong adjustable platform assembly of roll or slideout character but also one smoothly slidably adjustable and firmly lockable in varied selected positions of adjustment; and in particular no one insofar as known has provided such a platform assembly in a form additionally capable of carrying with it a ramp assembly useful to provide a sloped surface from ground level to the slideout platform at a variety of positions for the platform.

SUMMARY OF THE INVENTION

This invention provides a rollout or slidable platform frame assembly of reliably strong structural relationship with respect to a base frame assembly as well as smoothly adjustable with respect to the base frame assembly and preferably also firmly lockable in a variety of selected positions of rollout or slideout adjustment. Optionally but preferably, the slidable frame assembly carries with it a ramp assembly extendable in a sliding manner therefrom to provide a sloped or inclined treadway or surface for rolling or driving or sliding a variety of vehicles or articles or objects from ground level onto the support or load-carrying platform surface of the slideable frame assembly. Ramp operability is not limited to any one position for the slidable platform frame assembly.

The base frame assembly of the apparatus is fixed rigidly to a standard or existing load-carrying bed of a vehicle such as a pick-up truck or van or possibly a larger vehicle, if desired. The base frame assembly includes laterally spaced parallel left and right track-forming means, as well as a lock guide rail in proximately spaced relationship to one of the track-forming means and aligned therewith.

The slidable frame assembly is mounted on the base frame assembly by means of left and right lateral edge trackway members which are slidably mated with the track-forming means of the base frame assembly. A significant part of the slidable frame assembly is that of a lock guide assembly having opposing guide rollers mounted for rolling movement on opposite sides of the lock guide rail of the base frame assembly as well as lock means biased for a normally locking relationship with the lock guide rail but releasable from that relationship for sliding adjustment of the slidable frame assembly with respect to the base frame assembly. Even without a ramp assembly, the apparatus provides convenience for the loading and unloading of articles from the load space of van-type vehicles and covered pick-up trucks, or even uncovered load spaces.

The ramp assembly of this invention, however, further enhances the versatility and convenience of loading and unloading. In its preferred form, the ramp assembly not only is storably carried by the slidable frame assembly aforenoted, but is somewhat interlocked therewith to permit quick ramp setup as well as quick return to storage, with ramp assembly operability maintained at all selected adjustments of slideout for the slidable frame assembly.

A multitude of additional features and benefits and advantages of the invention will become evident as this description further proceeds.

BRIEF DESCRIPTION OF THE DRAWINGS

FIG. 1 is a schematic perspective view of a pick-up truck (with its front end broken away) equipped with adjustable load-carrying apparatus of the invention and shows the apparatus in extended condition;

FIG. 2 is likewise a schematic perspective view, with the pick-up truck partially broken away, illustrating adjustable load-carrying apparatus of the invention in partially extended condition and with the ramp deck of the ramp assembly in lowered ramp use condition;

FIG. 3 is a schematic perspective view of enlarged character (with portions broken away and some parts omitted to improve clarity of showing for others) illustrating the adjustable load-carrying apparatus of the invention and particularly the three main assemblies of the apparatus, namely the base frame assembly, the slidable platform frame assembly, and the ramp assembly;

FIG. 4 is a schematic perspective view looking down on one side of the base frame assembly, with the other side broken away, and particularly illustrates an edge or lateral frame member of the base frame assembly as well as the lock guide rail thereof;

FIG. 5 is an underside view (i.e., looking up to view the underside) of the slidable frame assembly, with parts broken away, the specific view being along the right underside of the slidable frame assembly where the lock guide assembly is located;

FIG. 6 is a fragmentary sectional view taken along line 6—6 of FIG. 3;

FIG. 7 is a fragmentary plan end view of the rear end right side of the apparatus, and is taken along line 7—7 of FIG. 3 but with the ramp assembly (as viewed in FIG. 7) in nonextended condition;

FIG. 8 is a schematic sectional view of the right side of the apparatus (with parts broken away and some omitted for purposes of clarity of showing) taken along line 8—8 of FIG. 3, that is, taken along a line at the forward end of the apparatus looking toward the rearward end;

FIG. 9 is a sectional view along a vertical plane aligned with the right side edge of the ramp assembly (i.e., along 9—9 of FIG. 3), with parts broken away, and particularly illustrating the pivot hinge of the ramp assembly as well as the forward guide section of that assembly (which remains in the ramp slideways of the slidable frame assembly) as well as the ramp deck extension which projects forwardly of the ramp deck itself and is in alignment with the ramp deck and lies over the hinge connection between the ramp deck and the forward guide section of the ramp assembly;

FIG. 10 is a fragmentary view of the underside of the ramp assembly at the location of the hinged connection between the ramp deck and the forward guide section of the ramp assembly; and FIG. 11 is a view of the underside of an alternate ramp assembly, with parts broken away, at the location of the hinged connection between adjustable sections of the ramp deck and the forward guide section of the ramp assembly.

DESCRIPTION OF PREFERRED EMBODIMENTS

In FIG. 1, a pick-up truck 10 with the standard manufacturers' existing bed 11 has mounted on that bed an adjustable load-carrying apparatus 12 generally consisting of the base frame assembly 13 and slidable frame assembly 14 of this invention. The slidable frame assembly 14 is shown in rearwardly extended condition and is ideal not only to facilitate loading and unloading of the vehicle but also as a workbench for on-site repair use. For example, the slidable frame assembly 14 may have fixed upon it a vice, anvil, power tools such as a grinder or small drill press, and even welding equipment, as desired for use in servicing or repairing equipment at its location.

In FIG. 2, a pick-up truck 15 is shown equipped with the adjustable load-carrying apparatus of the invention. The base frame assembly 16 of the apparatus is fixed to the standard bed of the truck; the platformed slidable frame assembly 17 is partially extended; and the ramp assembly 18 is also extended and in condition for ramp use.

Referring now to FIG. 3, the overall base frame assembly of the invention is designated 20, the overall slidable frame assembly is designated 40, and the overall ramp assembly is designated 70. Details of the structures of each of these assemblies will become evident in further describing FIG. 3 in connection with other figures of the drawing.

Refer now to FIGS. 3 and 4 for a description of the base frame assembly. This assembly has laterally spaced parallel left 21 and right 22 frame members typically consisting of angle irons. These angle irons are tied together by laterally extending brace bars or rods 23, 24, 25, and 26. Suitable bolt holes or other fastening means are provided in the flat base flange 27 of the lateral angle irons 21 and 22 for mounting the base assembly onto the existing or manufacturer's bed of a vehicle. Along the upright flange portion 28 and 29 of the lateral frame members are mounted a plurality of inwardly facing rollers 30 in spaced longitudinal alignment; and these rollers 30 constitute the left and right track-forming means of the base assembly. Each roller is mounted on any suitable horizontally extending axis stud or the like fixed by bolt means to the upright flange portion 28 and 29 of the lateral frame members. At the rearward end 31 of one of the lateral frame members is located a releasable rearward stop member, suitably a pin 32 passing through a hole in the upright flange 29 of the lateral angle iron and lodged in a hole or recess of an anchor or bracket 33 (shown in FIGS. 4, 6, 7, and 8) fixed on a rear cross member 23 of the base frame assembly. Additionally, a forward stop member 34 is fixed in the path of one of the track-forming means and may simply consist of a block welded in the recess of the angle of an angle iron of a base frame member. Both the rearward 32 and forward 34 stop members preferably are in the path of the same track-forming means, that is, preferably in the path of the right track-forming means and mounted on the angle iron of that side. The final element of the base assembly is a lock guide rail 35 (see FIG. 4). The lock guide rail is a lock receiving rail and also a rail that serves as a guide rail for the rollout slidable frame assembly to be discussed. The lock guide rail is in proximately spaced relationship to one of the track-forming means (i.e., series of rollers 30 on one of the left or right frame members 21 or 22) and is aligned therewith. Preferably, it is very close to but slightly spaced, as illustrated, from the frame member 22 of the right track-forming means. This rail preferably consists of an angle iron with a plurality of holes 36 spaced along the upright flange portion thereof for receiving a locking pin. Portions of the base assembly are also illustrated in other figures of the drawings (see FIGS. 5 through 8) and are given numbers in those figures common to the numbering employed in FIGS. 3 and 4.

Refer now particularly to FIGS. 3 and 5 through 8 for details of the structure of the slidable platform frame assembly 40. This assembly has left and right lateral edge trackway members 41 and 42 which are fixed along the lateral edges of a rectangular platform frame. The rectangular platform frame suitably consists of the lateral edge members 41 and 42 and crossbeams or rods or braces 43, 44, 45, and 46, giving the rectangular frame rigidity and strength. Observe that the trackway members 41 and 42 suitably may be formed by two angle irons welded together to form a U-shaped channel; and the U-shaped channel forms the trackway. The left and right trackways 41 and 42 are slidably mated with the left and right base assembly track-forming means, that is, with aligned rollers 30 on the left and right lateral angle iron frames 21 and 22 of the base frame 20. In effect, the U-shaped channel of the trackway members constitutes a runway within which the rollers of the base frame operate. Importantly, the structural relationships permit a single set of rollers along each track-forming structure to function as weight or stress bearing members both for downward and upward pressures as may be exerted on the trackways of the slidable frame assembly during extension of the slidable frame. Over the rectangular platform frame of the slidable frame assembly is a suitable platform 47 such as for example a plywood sheet fixed by screws or bolts or any other suitable means to the frame. A channel of one trackway 42 (namely the trackway on the lateral side of the base frame where the rearward and forward stop members of the base assembly are located) has in it, as by welding, a rigidly fixed lug means or block 48 for abutting against the rearward 32 and forward 34 stop members of the base frame assembly. The location of the block 48 is adjusted so as to effectively permit substantial rearward extension of the slidable frame assembly, but limit that longitudinal rearward movement of the slidable frame assembly so as to maintain the trackway members 41 and 42 at a location occupied by at least two of the rearward rollers 30 in each side frame 21 and 22 of the base frame. Thus the slidable frame is always maintained in a planar relationship to the base frame even at the outward rearmost extension of it. The lug means 48 limits the longitudinal movement of the slidable frame assembly with respect to the track-forming means of the base frame and limits that longitudinal movement to a range between the rearward 32 and forward 34 stop members of the base frame.

Beneath the slidable frame assembly 40 and mounted to the underside of the platform frame structure of it are two overall structures or assemblies, namely a lock guide assembly 50 and laterally spaced left and right ramp slideways 51 and 52. These structures are only fragmentarily shown in FIG. 3.

The lock guide assembly is best shown in FIG. 5, which is an underside view of a portion of the slidable frame assembly. Reference, however, should be made to FIGS. 3 and 5 through 8 in connection with the following description of it inasmuch as each such Figure shows some portion of it. The guide feature of it is provided by opposing guide rollers 53 and 54 mounted on vertically depending shafts which are fixed to a base plate 55 welded or otherwise permanently secured to frame elements (e.g., track channel member 42 and crossbeam 45) of the rectangular platform frame. These opposing guide rollers 53 and 54 are located on opposite sides of the lock guide rail 35 of the base frame assembly. They roll along the upward or horizontally oriented flange portion of the lock guide rail as the slidable frame assembly 40 is shifted longitudinally along the track-forming means of the base frame 20. Significantly, without such guide means, some tendency arises for the slidable frame assembly to shift from a rather perfect parallel alignment of its edge trackway members with respect to the lines of the track-forming rollers of the base frame. The opposing guide rollers on the slidable frame, in cooperation with the guide rail on the base frame, prevent joggling of the slidable frame assembly with respect to the base frame and obviate binding or dislocation problems. This guide assembly thus contributes to smooth operation for sliding the slidable frame assembly.

Additionally, the lock guide assembly 50 mounted underneath the platform frame includes a locking pin 56 at a forward location under the slidable frame assembly and oriented perpendicular to the lock guide rail 35 (see FIGS. 5 and 8). The pin 56 is mounted in the hole of upstanding spaced apart brackets 57 and 58 fixed to the baseplate 55 carrying the opposing guide rollers 53 and 54. Also, the pin is spring biased by a spring 59 lodged at one end against the far bracket 57 and against a collar 60 fixed to the pin 56 and abutting against the inner or nearest upstanding bracket 58 located adjacent the guide rail, with the result that the spring biases the pin for a normally locking relationship in one of a series of holes 36 (see FIG. 4) along the lock guide rail. To the end of the locking pin 56 most remote from the guide rail 35 is fixed a cable 61. Mounted in a hole of a vertical bracket 62 (which is welded at the rearward end underside of the platform frame between a ramp slide 52 and trackway member 42 on the side of the apparatus where the lock guide rail 35 is located) is a pull handle assembly consisting of a pull handle 63 at the end of a shaft 64 carrying an enlarged collar or abutment member as a stop for striking the bracket 62. The cable 61 is fixed at its other end to the handle shaft 64 and extends from that location—in a parallel aligned relationship to elements such as the lock guide rail 35 as well as the channeled trackway 42—until it is entrained about an inward pulley 65 mounted on a vertical shaft fixed to the foundation plate 55. From that inward pulley location nearest the lock guide rail, the cable passes in entrained fashion about an outward pulley 66 of similar nature and then in a relatively straight condition to its point of being fixed on the end of the locking pin 56. A slack-removing spring 67 is suitably mounted at spaced locations along the cable 61, as illustrated, so as to maintain the handle pull 63 always in a lodged condition within the bracket 62. A simple pull on the handle 63 will serve to dislodge or disengage the locking pin 56 from a hole 36 in the locked guide rail 35 and permit sliding movement of the slidable platform frame assembly 40 as desired between the limits of the stop members 32 and 34 delimiting the longitudinal shift of the slidable frame assembly. Fixing the slidable frame assembly against movement may be accomplished at any location where the lock pin 56 is allowed to fall into a recess or hole 36 of the lock guide rail 35.

Also mounted to the underside of the platform frame are laterally spaced left and right ramp slideways 51 and 52 as particularly illustrated in FIG. 3, and in part in FIGS. 5 through 8 inclusive, and also in cross-section in FIG. 9. The laterally spaced left and right ramp slideways 51 and 52 suitably consist of an angle iron of relatively L-shape with the upper edge end of the L-shape welded or fixed to the underside of the platform frame and the leg of the L-shape of each angle iron disposed inwardly or medially, that is, toward each other in an opposing relationship. The ramp slideways are parallel with each other and also parallel with the trackway members 41 and 42 of the slidable frame assembly. One of the ramp slideways 52 (and preferably both) is equipped with a lock member 68, suitably a hole or recess in the bottom leg part at the rearward end thereof. Also, near the rearward end of the ramp slideway 52, but spaced from that end, is a ramp stop member 69 (see FIGS. 5, 7, and 9) suitably consisting of a bolt or other projection fixed to the underside of the lower leg of the ramp slideway. The function of these elements will best be understood by turning now to a discussion of the ramp assembly 70.

The ramp assembly (see FIGS. 3, and 6 through 10) has a basic structure consisting of the ramp deck 71 itself. The deck is preferably rectangular with the perimeter defined by sturdy rods or bars of rectangular cross-section and suitably hollow. Illustratively, the lateral side edges are formed of such bars 72 and 73. For strength purposes, intermediate bars 74 aligned and parallel with the side edges are disposed at intervals between them. The rear edge is formed of such a bar 75 as well as the forward edge 76. Over these bars is secured the deck material 71, preferably expanded metal, because it is self-cleaning in that it has openings for the fall-through of dirt or debris and because the expanded metal contours provide good tread gripping means. On the rear edge bar 75 is carried a latching means such as a lock pin 77 for fitting into the ramp lock member 68 or recess at the rear edge of a ramp slideway 52 (and a similar latching means may be employed for a recess in the other slideway), so as to maintain the ramp assembly 70 in fixed storage condition with respect to the slidable frame assembly 40 when the ramp is not in use as a ramp.

Fixed to the forward edge bar or cross member of the ramp deck structure is a hinge-forming means, illustratively a tubular member or pipe 78 (see FIG. 10). Further forwardly of the ramp deck structure is a forward guide section 79 which forms a part of the ramp assembly. In essence, the guide section is comparable in structure to a ramp but for the fact that it has no need for a cover member or expanded metal surface. The guide section suitably consists of laterally extending cross members or bars 80 and 81 plus side edge bar elements 82 and 83 (riding in the ramp slideways) which secure that section of the assembly into a rigid or firm structure. The rearwardmost cross member 80 of the guide section has fixed to it as by welding some tubular elements or pipe members 84 and 85, as illustrated at each lateral side in FIG. 10 and as viewable from one side in FIG. 9. A rod 86 extends through the spaced pipe sections fixed to the guide section as well as through the pipe section fixed to the ramp deck structure so as to form a pivotable hinged connection between the ramp deck structure and the guide section. Further, carried on the guide section and fixed to it is a gripping abutting means 87 (see FIGS. 6 through 9) suitably a short angle iron of L-shape, with the upper edge or top of the L-shape welded to a bar portion of the guide section so as to effect an outward projection of the leg portion of the L-shaped abutment at a location underneath the leg of a ramp slideway. The bottom leg portion of the L-shaped member 87 thus serves as a grip under the ramp slideway and as an abutment means for striking the ramp stop member 69 fixed on the underside of a ramp slideway. Each side of the ramp guide section is preferably equipped with such a gripping abutting means; and preferably each ramp slideway is equipped on its underside with a ramp stop member such as the stop member 69 in FIGS. 7 and 9.

The final portion of the ramp assembly consists of a ramp deck extension 88 (FIG. 9) which projects forwardly of the main body portion of the ramp deck structure 71. The deck extension is in alignment with the ramp deck and lies over the hinge connection between the ramp deck and the forward guide section. In essence, the ramp assembly is pulled rearwardly from the composite slidable frame assembly until the abutting means 87 strikes the ramp stop 69. A substantial or foundation portion of the guide section thus remains in the ramp slideways; and that portion is locked therein in parallel relationship on the slideway by the gripping abutment means 87. Then the ramp is pivoted downwardly to rest on the ground at its rearwardmost edge. It is at this time that the ramp deck extension 88 serves as a bridging element over the pivot portion of the ramp assembly from the ramp deck 71 to the platform portion 47 of the slidable platform frame assembly.

In FIG. 11, a bifurcated or split ramp deck consists of side ramp decks 89 and 90. These are hinged to the forward guide section 91 of the ramp assembly at pivot rod connection 92, with short pipe members 93 and 94 fixed on the split deck parts 89 and 90. Thus sideways sliding adjustment of the split ramp deck parts is possible to accommodate wider track vehicles.

It should be recognized that the arrangement of elements and the use of preferred elements allows for extraordinary convenience of manufacture and assembly and disassembly of the several main assemblies or structures forming the apparatus of the invention. For example, by employing bolt-type members as the ramp stops, removal of the same permits easy removal of the ramp assembly from the slideways for it. The releaseable rearward stop member of the base frame assembly is easily removed from its location simply by removing the pin thereof, which permits slide-out removal of the slidable platform frame assembly in its entirety from the base frame assembly. Nevertheless, with the elements assembled as illustrated, longitudinal roll-out sliding shift of the slidable frame assembly in its entirety, with the ramp assembly carried with it in all such movement, is accomplished with great ease, there being no binding problems. The safety stop features are such as to maintain the slidable platform frame assembly with firm support strength and in level condition at all locations along its operable sliding length as limited by the stop means. Thus the stop means provide safety, preventing accidental disengagement of the slidable frame assembly from the base frame. The slidable frame assembly does not need additional support from the ground when it is extended. It operates with only one set of rollers and a track system cooperative therewith on each side of the apparatus, with the relationships effective to handle both upward and downward pressures as may be exerted against the trackways as the position of the slidable frame assembly varies with respect to the base frame.

The apparatus of the invention thus provides a very simple and safe and inexpensive arrangement of elements for facilitating the loading and unloading of vehicles. It may be installed on any of a variety of existing deck beds or loading beds of vehicles, including even trailers. The tuck-away self-storing ramp assembly remains always in proper position for extension out of a ramp slideway and ramp use, regardless of the location of the composite slidable frame assembly with respect to the base frame. Advantageously, the versatility of the apparatus includes that of converting a relatively short truck bed, such as characteristic of a pick-up truck, into a relatively long one by rearwardly extending the slidable frame assembly, to thereby permit the hauling of long poles or lumber or the like. Expanded metal as the uppermost surface of the ramp deck structure provides for a self-cleaning ramp. Use of the apparatus avoids the necessity to change the cosmetic appearance of the exterior of a vehicle. If desired, the ramp deck may be extended somewhat to provide for additional workbench space beyond that afforded by the platform of the slidable frame assembly. Of extraordinary importance is the fact that the ramp assembly stores quickly and easily under the bed or platform of the slidable frame assembly, without regard to the exact position of the slidable frame assembly with respect to the stationary or rigidly fixed base frame.

Those skilled in the art will appreciate that the invention may be embodied in other specific forms than illustrated without departing from the spirit or essential characteristics thereof. The present embodiments are therefore to be considered in all respects illustrative and not restrictive, the scope of the invention being indicated by the appended claims rather than by the foregoing description; and all changes which come within the meaning and range of equivalency of the claims as construed for validity are therefore intended to be embraced thereby.

That which is claimed is:

1. Adjustable load-carrying apparatus for mounting on the load-carrying bed of a vehicle, comprising
  a base frame assembly for fixing rigidly to the vehicle bed and including
    laterally spaced parallel left and right track-forming means, each comprising a path formed by a plurality of inwardly facing rollers spaced in longitudinal alignment along lateral frame members of the base frame assembly, and
    a lock guide rail in proximately spaced relationship to one of said track-forming means and aligned therewith, and
  a slidable load-carrying platform frame assembly mounted on said base frame assembly and extending above said base assembly, said platform frame assembly including
    a rectangular platform frame,
    left and right lateral edge trackway members fixed on the lateral edges of said platform frame and slidably mated with said rollers of said track-forming means of said base frame assembly, a lock guide assembly mounted to the underside of said platform frame and including opposing guide rollers mounted for rolling movement on opposite sides of said lock guide rail of said base frame assembly, releasable locking means biased for a normally locking relationship with said lock guide rail, and laterally spaced left and right ramp slideways mounted to the underside of said platform frame, and a ramp assembly mounted for sliding movement in said ramp slideways of said slidable assembly and including
 a rectangular ramp deck,
 a forward guide section, and
 a hinge connection between said ramp deck and said forward guide section, whereby said ramp deck may be pivotally lowered for ramp use while a foundation portion of the forward guide section remains in the ramp slideways of the slidable frame assembly.

2. The apparatus of claim 1 wherein said base frame assembly includes a releaseable rearward stop member in the path of one of said track-forming means, and wherein said slidable frame assembly includes a fixed lug means for abutting against said rearward stop member of said base frame assembly to thereby limit the rearward longitudinal movement of said slidable frame assembly with respect to said track-forming means of said base frame assembly.

3. The apparatus of claim 2 wherein said base frame assembly additionally includes a fixed forward stop member in the path of said track-forming means and adapted to be abutted against by the fixed lug means of said slidable frame assembly, thereby to limit forward longitudinal movement of said slidable frame assembly with respect to said track-forming means of said base frame assembly.

4. The apparatus of claim 1 wherein said locking means comprises a spring-biased lock and said lock guide rail is equipped with a plurality of spaced lock-receiving means.

5. The apparatus of claim 1 wherein said locking means comprises
 a lock pin at a forward location perpendicular to said lock guide rail and biased for a normally locking relationship therewith
 bracket means for slidably holding and guiding longitudinal movement of said lock pin,
 a pull handle at a rearward end location on said platform assembly, and
 cable means entrained over pulleys and extending between said lock pin and handle, whereby pulling on said handle effects withdrawal of said lock pin from a locking relationship with said lock guide rail, thereby to permit slide movement of said slidable frame assembly along said track-forming means of said base frame assembly.

6. Adjustable load-carrying apparatus for mounting on the load-carrying bed of a vehicle, comprising
 a base frame assembly for fixing rigidly to the vehicle bed and including laterally spaced parallel left and right track-forming means,
 a slidable load-carrying platform frame assembly mounted on said base frame assembly and extending above said base frame assembly, said platform frame assembly including left and right lateral edge trackway members slidably mated with said track-forming means of said base frame assembly so as to permit sliding shift of said slidable frame assembly with respect to said base frame assembly, said slidable frame assembly including laterally spaced left and right ramp slideways medially inward from said trackway members thereof, and
 a ramp assembly mounted for sliding movement in said ramp slideways of said slidable assembly and carried by said slidable assembly during slidable movement thereof with respect to said base frame assembly, said ramp assembly including a rectangular ramp deck, a forward guide section, and a hinge connection between said ramp deck and said forward guide section, whereby said ramp deck may be pivotally lowered for ramp use while a foundation portion of the forward guide section remains in the ramp slideways of the slidable frame assembly.

7. The apparatus of claim 6 wherein said ramp assembly additionally includes a ramp deck extension projecting forwardly of said ramp deck and in alignment with said ramp deck and lying over said hinge connection between said ramp deck and said forward guide section.

8. The apparatus of claim 6 wherein said ramp slideways include a ramp lock member, and wherein said ramp assembly includes latching means on the ramp deck thereof for cooperative latching with said ramp lock member to fix said ramp assembly against sliding movement in said ramp slideways.

9. The apparatus of claim 6 wherein said ramp slideways include a ramp stop member and wherein said ramp assembly includes an abutting means mounted on the forward guide section thereof for striking said ramp stop member to thereby limit the rearward sliding movement of the ramp assembly so as to retain a foundation portion of the guide section in said ramp slideways when said ramp deck is withdrawn from said slideways for ramp use.

10. Adjustable load-carrying apparatus for mounting on the load-carrying bed of a vehicle, comprising
 a base frame assembly for fixing rigidly to the vehicle bed and including
  laterally spaced parallel left and right track-forming means, each comprising a path formed by inwardly facing rollers spaced in longitudinal alignment along lateral frame members of the base frame assembly,
  a lock guide rail in proximately spaced relationship to one of said track-forming means and aligned therewith, said rail including a plurality of spaced recesses therealong for receiving a lock pin,
  a releaseable rearward stop member in the path of one of said track-forming means, and
  a fixed forward stop member in the path of said one track-forming means,
 a slidable frame assembly mounted on said base frame assembly and including
  a rectangular platform frame
  left and right lateral edge trackway members fixed on the lateral edges of said platform frame and slidably mated with said track-forming means of said base frame assembly,
  fixed lug means for abutting against the rearward and forward stop members of said base frame assembly, to thereby limit longitudinal movement of said slidable frame assembly with respect to said track-forming means of said base frame assembly,
a lock guide assembly mounted to the underside of said platform frame and including opposing guide rollers mounted for rolling movement on opposite sides of said lock guide rail of said base frame assembly, a spring-biased lock pin at a forward location perpendicular to said lock guide rail for a normally locking relationship therewith, bracket means for slidably holding and guiding longitudinal movement of said lock pin, a pull handle at a rearward end location on said platform assembly, and cable means entrained over pulleys and extending between said lock pin and handle, whereby pulling on said handle effects withdrawal of said lock pin from a locking relationship with said lock guide rail, thereby to permit sliding movement of said slidable frame assembly along said track-forming means of said base frame assembly, and
laterally spaced left and right ramp slideways mounted to the underside of said platform frame and including a ramp stop member and a ramp lock member, and
a ramp assembly mounted for sliding movement in said ramp slideways of said slidable assembly and including
a rectangular ramp deck carrying a latching means cooperative with said ramp lock member to fix said ramp assembly against sliding movement in said ramp slideways,
a forward guide section including abutting means for striking said ramp stop member to thereby limit rearward sliding movement of the ramp assembly so as to retain a foundation portion of said guide section in said ramp slideways when said ramp deck is withdrawn from said slideways for ramp use,
a hinge connection between said ramp deck and said forward guide section, whereby said ramp deck may be pivotally lowered for ramp use while a foundation portion of the guide section is retained in the ramp slideways of the slidable frame assembly, and
a ramp deck extension projecting forwardly of said ramp deck and in alignment with said ramp deck and lying over said hinge connection between said ramp deck and said forward guide section.

11. Adjustable load-carrying apparatus for mounting on the load-carrying bed of a vehicle, comprising
a base frame assembly for fixing rigidly to the vehicle bed and including
laterally spaced parallel left and right track-forming means, each comprising inwardly facing rollers spaced in longitudinal alignment along lateral frame members of the base frame assembly, and
a lock guide rail in proximately spaced relationship to one of said track-forming means and aligned therewith, and
a slidable platform frame assembly mounted on said base frame assembly and including
a rectangular platform frame,
left and right lateral edge trackway members fixed on the lateral edges of said platform frame and slidably mated with said track-forming means of said base frame assembly, and
a lock guide assembly mounted to the underside of said platform frame and including opposing guide rollers mounted for rolling movement on opposite side of said lock guide rail of said base frame assembly, and releaseable locking means biased for a normally locking relationship with said lock guide rail,
wherein said locking means comprises
a lock pin at a forward location perpendicular to said lock guide rail and biased for a normally locking relationship therewith
bracket means for slidably holding and guiding longitudinal movement of said lock pin,
a pull handle at a rearward end location on said platform assembly, and
cable means entrained over pulleys and extending between said lock pin and handle, whereby pulling on said handle effects withdrawal of said lock pin from a locking relationship with said lock guide rail, thereby to permit slide movement of said slidable frame assembly along said track-forming means of said base frame assembly.

* * * * *